(12) United States Patent
Fujita et al.

(10) Patent No.: US 11,926,111 B2
(45) Date of Patent: Mar. 12, 2024

(54) MANUFACTURING METHOD FOR FIBER-REINFORCED PLASTIC COMPOSITE

(71) Applicant: Toray Industries, Inc., Tokyo (JP)

(72) Inventors: Yuzo Fujita, Ehime (JP); Takuya Karaki, Ehime (JP); Kentaro Adachi, Ehime (JP)

(73) Assignee: Toray Industries, Inc., Tokyo (JP)

( * ) Notice: Subject to any disclaimer, the term of this patent is extended or adjusted under 35 U.S.C. 154(b) by 600 days.

(21) Appl. No.: 16/754,178

(22) PCT Filed: Oct. 17, 2018

(86) PCT No.: PCT/JP2018/038645
§ 371 (c)(1),
(2) Date: Apr. 7, 2020

(87) PCT Pub. No.: WO2019/078243
PCT Pub. Date: Apr. 25, 2019

(65) Prior Publication Data
US 2021/0213691 A1    Jul. 15, 2021

(30) Foreign Application Priority Data

Oct. 20, 2017 (JP) ................................ 2017-203168

(51) Int. Cl.
*B29C 70/46* (2006.01)
*B29C 43/02* (2006.01)
(Continued)

(52) U.S. Cl.
CPC .......... *B29C 70/465* (2013.01); *B29C 43/021* (2013.01); *B29C 43/18* (2013.01);
(Continued)

(58) Field of Classification Search
None
See application file for complete search history.

(56) References Cited

U.S. PATENT DOCUMENTS

| 10,357,926 B2 | 7/2019 | Kondo et al. |
| 2010/0028616 A1 | 2/2010 | Yamanouchi et al. |
| (Continued) | | |

FOREIGN PATENT DOCUMENTS

| DE | 102007024530 A1 * | 11/2008 | ............. B29C 43/18 |
| JP | 56144956 A | 11/1981 | |
| (Continued) | | | |

OTHER PUBLICATIONS

Chen, Zhong, et al. "Variation and consistency of Young's modulus in steel." Journal of Materials Processing Technology 227 (Aug. 28, 2015): 227-243. (Year: 2015).*

(Continued)

*Primary Examiner* — Benjamin A Schiffman
(74) *Attorney, Agent, or Firm* — Buchanan Ingersoll & Rooney PC

(57) ABSTRACT

Provided is a method for manufacturing a fiber-reinforced plastic composite containing a fiber-reinforced plastic part having a plate-like portion and a rib protruding from one surface of the plate-like portion, and a metal part, having an average thickness of 0.5-3.0 mm, laminated on part of or all of the plate-like portion of the fiber-reinforced plastic part, comprising:

a lamination step for stacking a plurality of incised prepreg layers as a plurality of sheets of base material to form a base laminate, each prepreg layer containing unidirectionally oriented fibers and resin, and a plurality of incisions crossing the fibers, a base material heating step for heating the base laminate, and a molding step for integrating the base laminate and the metal part by pressing them between a rib molding
(Continued)

member having a recessed portion for forming a rib and a skin molding member free of such a recessed portion in a pressing device.

7 Claims, 1 Drawing Sheet

(51) Int. Cl.
| | |
|---|---|
| *B29C 43/18* | (2006.01) |
| *B29C 43/20* | (2006.01) |
| *B29C 70/06* | (2006.01) |
| *B29C 70/10* | (2006.01) |
| *B29C 70/42* | (2006.01) |
| *B29C 70/68* | (2006.01) |
| *B29C 70/78* | (2006.01) |
| *C08J 5/24* | (2006.01) |
| *B29C 43/32* | (2006.01) |
| *B29C 43/36* | (2006.01) |
| *B29K 105/08* | (2006.01) |
| *B29K 307/04* | (2006.01) |
| *B29L 31/30* | (2006.01) |

(52) U.S. Cl.
CPC ............. *B29C 43/20* (2013.01); *B29C 70/06* (2013.01); *B29C 70/10* (2013.01); *B29C 70/42* (2013.01); *B29C 70/46* (2013.01); *B29C 70/68* (2013.01); *B29C 70/78* (2013.01); *C08J 5/243* (2021.05); *B29C 2043/3205* (2013.01); *B29C 43/36* (2013.01); *B29K 2105/0872* (2013.01); *B29K 2105/0881* (2013.01); *B29K 2307/04* (2013.01); *B29L 2031/30* (2013.01)

(56) References Cited

U.S. PATENT DOCUMENTS

| | | | |
|---|---|---|---|
| 2018/0104869 A1* | 4/2018 | Maeda | B29C 70/46 |
| 2019/0232528 A1* | 8/2019 | Tsuda | B29B 15/08 |
| 2020/0039111 A1 | 2/2020 | Tsumura et al. | |

FOREIGN PATENT DOCUMENTS

| | | | | |
|---|---|---|---|---|
| JP | 06293036 A | * | 10/1994 | |
| JP | 06293036 A | | 10/1994 | |
| JP | 0776051 A | | 3/1995 | |
| JP | 2014100829 A | | 6/2014 | |
| JP | 2014148113 A | | 8/2014 | |
| JP | 2015160524 A | | 9/2015 | |
| KR | 20180075505 A | * | 7/2018 | ............... C08J 5/04 |
| WO | 2008038429 A1 | | 4/2008 | |
| WO | WO-2016159118 A1 | * | 10/2016 | ......... B29C 37/0053 |
| WO | 2018147324 A1 | | 8/2018 | |

OTHER PUBLICATIONS

Amesweb, Young's Modulus of Steel, https://amesweb.info/Materials/Youngs-Modulus-of-Steel.aspx, Apr. 20, 2018 (Year: 2018).*

Anon, N. "Elevated-temperature properties of ferritic steels." American society for metals ASM handbook 1 (Jan. 1, 1990): 617-652. (Year: 1990).*

International Search Report and Written Opinion for International Application No. PCT/JP2018/038645, dated Nov. 20, 2018, 5 pages.

* cited by examiner

[Fig. 1]
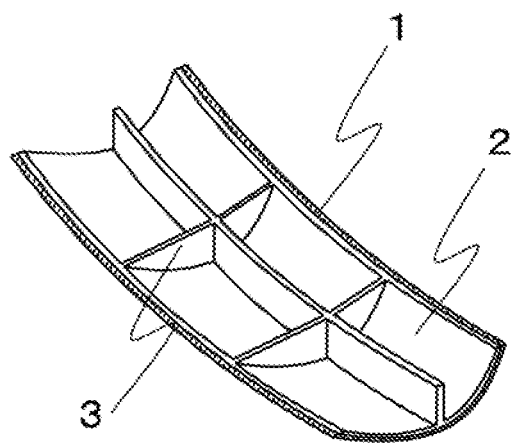
[Fig. 2]
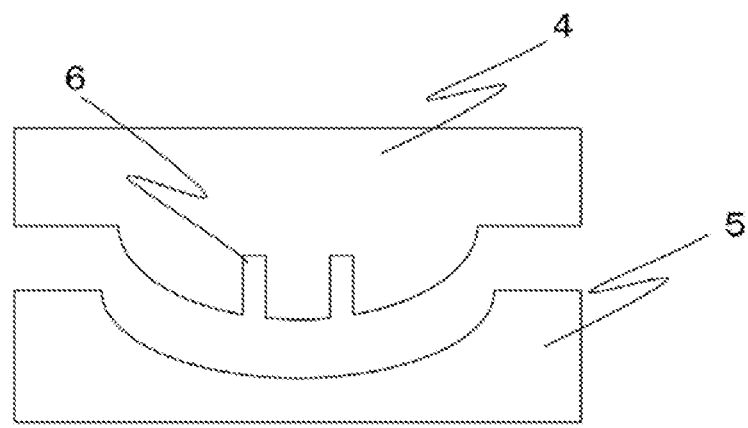

MANUFACTURING METHOD FOR FIBER-REINFORCED PLASTIC COMPOSITE

CROSS REFERENCE TO RELATED APPLICATIONS

This is the U.S. National Phase application of PCT/JP2018/038645, filed Oct. 17, 2018, which claims priority to Japanese Patent Application No. 2017-203168, filed Oct. 20, 2017, the disclosures of each of these applications being incorporated herein by reference in their entireties for all purposes.

FIELD OF THE INVENTION

The present invention relates to a fiber-reinforced plastic molding provided with a rib as a raised portion on the surface of a thin plate-like part portion.

BACKGROUND OF THE INVENTION

Fiber-reinforced plastics made of reinforcing fibers (hereinafter simply referred to as fibers) and a resin have high specific strength, and high specific rigidity as well as excellent mechanical properties and high functional properties such as weather resistance and chemical resistance, and accordingly, fiber-reinforced plastics have received a wide attention as materials for industrial use such as structural elements of aircraft, spacecraft, motor vehicles, railways, ships, electric appliances, and sport gear, and their demands are increasing year by year.

Fiber-reinforced plastics are used in combination with metals in some applications. In Patent document 1, for example, discloses an invention designed to produce a light weight and high strength metal/CFRP composite by curing a prepreg, i.e., an intermediate substrate of a fiber-reinforced plastic, while bonding it to hot-pressed metal. Patent document 2 discloses an automobile body structure produced by boning a metallic hollow frame to a reinforcing material made of CFRP having a thickness of 0.8 mm or more. A large number of methods have also been proposed for surface treatment of metals to develop high adhesiveness to fiber-reinforced plastics, and for example, Patent document 3 describes that high adhesiveness can be obtained by using aluminum material with a surface roughness of less than 2 μm when bonding fiber-reinforced plastics to aluminum material.

PATENT DOCUMENTS

Patent document 1: Japanese Unexamined Patent Publication (Kokai) No. 2014-100829
Patent document 2: Japanese Unexamined Patent Publication (Kokai) No. 2015-160524
Patent document 3: Japanese Unexamined Patent Publication (Kokai) No. 2014-148113

SUMMARY OF THE INVENTION

In any of the patent documents, however, although fiber-reinforced plastics are used for reinforcing a metal member, there is no consideration that there is room for improvement to realize more effective reinforcement. For example, there is no consideration about the possibility of realizing further reinforcement while maintaining lightness, which is achieved by utilizing the formability of prepreg, thus resulting in a limited reinforcing effect.

In order to solve the above problems, the present inventors provides the following production method for manufacturing a fiber-reinforced plastic composite. Specifically it is a method for manufacturing a fiber-reinforced plastic composite containing a fiber-reinforced plastic part having a plate-like portion and a rib that protrudes from one surface of the plate-like portion, and a metal part laminated on part of or all of the plate-like portion of the fiber-reinforced plastic part, comprising:
a lamination step for stacking a plurality of sheets of base material to form a base laminate,
a base heating step for heating the base laminate, and
a molding step for integrating the base laminate and the metal part by pressing them between a rib molding member having a recessed portion for forming the rib and a skin molding member free of such a recessed portion in a pressing device,
the metal part having an average thickness of 0.5 to 3 mm,
the base laminate including, as sheets of base material, a plurality of incised prepreg layers, each prepreg layer containing unidirectionally oriented fibers and resin and a plurality of incisions crossing the fibers, and
in the molding step, the absolute value of the acute angle between the orientation direction of the unidirectionally oriented fibers included in the incised prepreg layer that is the closest to the rib molding member and the length direction of the recessed portion of the rib molding member, which is represented as $\theta s$, being less than 60°.

The present invention can provide a method for manufacturing a composite of a metal and a fiber-reinforced plastic having a high reinforcing effect while maintaining lightness.

BRIEF DESCRIPTION OF THE DRAWINGS

FIG. 1 This gives an example of the fiber-reinforced plastic composite according to the present invention.
FIG. 2 This gives a conceptual diagram of a rib molding member and a skin molding member used in the molding step.

DETAILED DESCRIPTION OF EMBODIMENTS OF THE INVENTION

After making intentional investigation aiming to provide a method for manufacturing a composite of a metal and a fiber-reinforced plastic having a high reinforcing effect while maintaining lightness, the present inventors has arrived at exemplary embodiments of the invention of a method for manufacturing a fiber-reinforced plastic composite containing a fiber-reinforced plastic part having a plate-like portion and a rib that protrudes from one surface of the plate-like portion, and a metal part laminated on part of or all of the plate-like portion of the fiber-reinforced plastic part, comprising a lamination step for stacking a plurality of sheets of base material to form a base laminate, a substrate heating step for heating the substrate laminate, and a molding step for integrating the base laminate and the metal part by pressing them between a rib molding member having a recessed portion for forming the rib and a skin molding member free of such a recessed portion in a pressing device, the metal part having an average thickness of 0.5 to 3 mm, the base laminate including, as sheets of base material, a plurality of incised prepreg layers, each prepreg layer containing unidirectionally oriented fibers and resin and a plurality of incisions crossing the fibers, and in the molding step, the absolute value of the acute angle between the orientation direction of the unidirectionally oriented fibers included in the incised prepreg layer that is the closest to the rib molding member and the length direction of the recessed portion of the rib molding member, which is represented as θs, being less than 60°.

The present inventors also has arrived at another embodiment of the invention of a method for manufacturing a fiber-reinforced plastic composite containing a fiber-reinforced plastic part having a plate-like portion and a rib that protrudes from one surface of the plate-like portion, and a metal part laminated on part of or all of the rib-protrusion-free side surface of the plate-like portion of the fiber-reinforced plastic part, comprising a lamination step for stacking a plurality of sheets of base material to form a base laminate, a substrate heating step for heating the substrate laminate, and a molding step for integrating the base laminate and the metal part by pressing them between a rib molding member having a recessed portion for forming the rib and a skin molding member free of such a recessed portion in a pressing device, the metal part having an average thickness of 0.5 to 3 mm, the base laminate including, as sheets of base material, a plurality of incised prepreg layers, each prepreg layer containing unidirectionally oriented fibers and resin and a plurality of incisions crossing the fibers, and in the molding step, the absolute value of the acute angle between the orientation direction of the unidirectionally oriented fibers included in the incised prepreg layer that is the closest to the rib molding member and the length direction of the recessed portion of the rib molding member, which is represented as θs, being less than 60°.

The fiber-reinforced plastic composite according to an embodiments of the present invention is a composite in which a thin metal part is combined with a fiber-reinforced plastic part having a plate-like portion and a rib that protrudes from one surface of the plate-like portion. For exemplary embodiments of the present invention, the plate-like portion is made of plate-like fiber-reinforced plastic, and a rib protrudes from one surface of the plate-like portion. The rib works to greatly improve the bending rigidity as compared with a plate-like fiber-reinforced plastic part free of such a rib, accordingly serving to realize a high reinforcing effect while maintaining lightness.

As shown in FIG. 1, in the fiber-reinforced plastic composite according to an embodiment of the present invention, a fiber-reinforced plastic part having a plate-like portion 2 and a rib 3 is bonded to a metal part 1, thereby allowing the composite to be high in both strength and lightness. The plate-like portion may be curved like the plate-like portion 2 shown in FIG. 1, or may be planar. The plate-like portion may have a uniform thickness or may partially differ in thickness. As shown in FIG. 1, there may be a plurality of ribs, and any of the ribs may intersect another or may not intersect another (FIG. 1 gives an example in which one rib intersect with other two ribs). The arrangement of the ribs and the shape features, such as width and height, of the ribs are designed appropriately in consideration of the balance between the weight and the mechanical properties of the relevant structural body. In general, narrow ribs are preferred because a high degree of freedom in design is ensured.

Though it's impossible to decide with absolute certainty on a particular volume ratio between the metal and the fiber-reinforced plastic in the fiber-reinforced plastic composite according to the present invention, it is preferable from the viewpoint of weight reduction that the volume of the fiber-reinforced plastic part is relatively large because the weight becomes larger as the volume of metal increases. Specifically the volume ratio of the fiber-reinforced plastic part to the metal is 1 or more, preferably 1.5 or more.

In the lamination step, a plurality of sheets of base material for manufacturing fiber-reinforced plastics are stacked to prepare a base laminate. The sheets of base material are fiber sheets which are composed mainly of fibers, prepreg layers which are composed mainly of fibers and resin, and resin sheets which are composed mainly of resin. For exemplary embodiments of the present invention, the base laminate contains, as sheets of base material, a plurality of incised prepreg layers, which are a special type of prepreg layers. To produce an incised prepreg layer, a plurality of incisions are made in a prepreg layer that contains unidirectionally oriented fibers and resin to provide a prepreg layer containing discontinuous fibers. For the incised prepreg layer, it is preferable that all fibers are cut to 10 to 30 mm length by the incisions. If such incised prepreg layers are used, the discontinuous fibers in the incised prepreg layers flow in the molding step, thereby serving to produce a fiber-reinforced plastic part having a plate-like portion and a rib that protrudes from the plate-like portion. The volume content (Vf) of the discontinuous fibers included in the sheets of base material is not particularly limited and can be decided on appropriately but Vf is preferably 40% to 65% in order to develop sufficiently good mechanical properties and high shape conformity.

For the incised prepreg layers, it is preferable that an appropriate layered structure is selected from among the following to suite the characteristics required of the molding to be produced:
    unidirectional lamination in which the layers are stacked with the fibers aligned in one direction, cross-ply lamination in which the layers are stacked with the fibers aligned orthogonally, pseudo-isotropic lamination in which the elastic modulus is pseudo-isotropic, and the like. It may be appropriate to adopt a lamination structure that permits shrinkage of the surface of the fiber-reinforced plastic part having a rib in order to reduce the residual stress that will remain between that part and the metal part.

As long as a plurality of incised prepreg layers are included, the base laminate may additionally contain a fiber sheet, a resin sheet, or a prepreg layer that are different from the incised prepreg layers as necessary or may be composed only of the incised prepreg layers. It is preferable that 50% or more of the volume of the base laminate is composed of incised prepreg layers in order to realize weight reduction and improvement in mechanical properties.

Useful fibers for exemplary embodiments of the present invention include, for instance, organic fibers such as aramid fiber, polyethylene fiber, and poly(paraphenylene benzoxazole) (PBO) fiber; inorganic fibers such as glass fiber, carbon fiber, silicon carbide fiber, alumina fiber, Tyranno fiber, basalt fiber, and ceramics fiber; metal fibers such as stainless steel fiber and steel fiber; other fibers such as boron fiber, natural fiber, and modified natural fiber. Among others, carbon fiber is lightweight compared with other reinforcing fibers and furthermore, it is particularly high in specific strength and specific modulus and also high in heat resistance and chemical resistance. In particular, PAN based carbon fiber, which permits easy production of high-strength carbon fiber, is preferable. It is also good to use a plurality of different types of fibers in combination.

The volume content (Vf) of the fibers included in a base material is not particularly limited and can be decided on appropriately, but Vf is preferably 20% to 65% and more preferably 40% to 65% in order to develop sufficiently good mechanical properties and high shape conformity.

A fiber sheet means a sheet in which fibers are randomly oriented in the plane of the sheet. It is preferable for a fiber sheet to be composed mainly of fibers having lengths of 10 to 30 mm.

A resin sheet may be inserted in the molding step with the aim of improving the fluidity of the discontinuous fibers in the incised prepreg layers contained in a base laminate or may be inserted with the aim of serving as an adhesive layer between the metal part and the fiber-reinforced plastic part.

In the prepreg layers other than the incised prepreg layers, fibers may be randomly oriented or may be unidirectionally oriented in the plane of the sheet.

The base material heating step is a step designed for heating the base laminate in order to improve the shapeability in the subsequent molding step.

In the case where the resin contained in the sheets of base material used to constitute the base laminate is a thermosetting resin, the heating temperature is preferably in the temperature range in which uncured resin can flow and then cure in a relatively short period of time, and it is preferably 130° C. to 190° C. In the case where the resin contained in the sheets of base material used to constitute the base laminate is a thermoplastic resin, it is preferably in the range from the melting point of the resin to the temperature equal to the melting point+100° C.

When the resin contained in the sheets of base material used to constitute the base laminate is a thermosetting resin, preferred heating methods include one in which the rib molding member and the skin molding member to be used in the molding step are heated in advance, followed by sandwiching the material between the two molding members to heat it and one in which it is put on either of the molding members so that it is heated. When the resin contained in the sheets of base material used to constitute the base laminate is a thermosetting resin having a high curing speed, holding the base laminate near the mold without bringing it into contact with the mold during heating in the base material heating step is also a good method, which may be performed separately or in combination with the method described above. When the resin contained in the sheets of base material used to constitute the base laminate is a thermoplastic resin, it is preferable to apply the method of preparing plates in addition to the mold to be used in the molding step and sandwiching the material between the plates, followed by heating them, and/or the method of using a non-contact type IR heater or the like to heat it. It is also preferable that the metal part to be combined with the base laminate in the molding step is heated together with the base laminate in this step.

The heating time can be appropriately set in accordance with various factors such as the form and temperature of the equipment and the size of the region to be heated. When the resin contained in the sheets of base material used to constitute the base laminate is a thermosetting resin, it is only necessary to heat the sheets of base material to a temperature at which uncured resin can flow and accordingly, the heating time is preferably 10 to 500 seconds. When the resin contained in the sheets of base material used to constitute the base laminate is a thermoplastic resin, it is preferably 10 to 2,000 seconds.

In the molding step, the heated base laminate and metal part are pressed to form a rib in the fiber-reinforced plastic part while integrating the fiber-reinforced plastic part and the metal part. It is preferable that the rib molding member and the skin molding member are heated in advance to a suitable temperature for curing the base laminate. Although it is preferable that the rib molding member and the skin molding member are heated to the same temperature, the rib molding member and the skin molding member may be heated appropriately to different temperatures in order to control the residual stress and the fluidity of resin and discontinuous fibers.

The rib molding member has a recessed portion for forming a rib on the surface that comes in contact with the base laminate as shown in FIG. 2 in which the rib molding member 4 has recessed portions 6. A plurality of such recessed portions may be present, and a plurality of recessed portions may intersect each other. It is preferable to apply a mold releasing agent to the rib molding member and the skin molding member so that the resin does not adhere to the mold.

The skin molding member does not have such recesses for molding ribs as in FIG. 2 which illustrates a skin molding member 5. However, it is not necessarily planar, and may have concavities and convexities that meet the shape requirements of the fiber-reinforced plastic composite to be manufactured so that, for example, a curved surface as shown in FIG. 1 can be obtained.

Since at least parts of the skin molding member and the rib molding member come in contact with the metal part, it is preferable to coat them with an oil agent or the like in order to prevent them from being damaged by friction with the metal part. Either of the rib molding member and the skin molding member may be the top force or the bottom force.

In the molding step, the base laminate and the metal part are first put between the rib molding member and the skin molding member, but the base laminate and the metal part may already be present between the rib molding member and the skin molding member in the base material heating step. At this time, the metal part may be disposed in either the skin molding member side or the rib molding member, or may be disposed in both members. The metal part and base laminate may be adhered to each other prior to placement or may be separately placed between the molding members. If the metal part is placed in the skin molding member or in the rib molding member, it works to allow the fiber-reinforced plastic part to have increased strength and also have a good surface appearance. If such metal parts are placed in both the skin molding member and the rib molding member, a fiber-reinforced plastic composite having sufficiently high strength can be obtained while the fiber-reinforced plastic part having a rib serves for reducing the weight.

According to another embodiment of the present invention, a metal part is disposed only in the skin molding member, and a base laminate is disposed in the rib molding member. The metal part and base laminate may be adhered to each other prior to placement or may be separately placed between the molding members. This allows a rib to be formed over a wider region and can minimize the required size of the metal part to permit a reduction in weight, making it possible to obtain a lightweight fiber-reinforced plastic composite.

Then, a pressure is applied to the heated base laminate and metal part to allow the discontinuous fibers in the incised prepreg layers contained in the base laminate to flow together with the resin, thereby shaping the plate-like portion while forming a rib, and at the same time integrating the fiber-reinforced plastic part and the metal part. At this time, although it is ideal if a rib can be formed while allowing the base laminate to maintain its layered structure, it is not necessary to maintain the layered structure. The pressure used in the molding step should be as high as required to form a rib, and the pressure applied to the plate-like portion is preferably 5 to 10 MPa.

For the present invention, as long as the laminating step, the base material heating step, and the molding step are included, other steps such as for painting and cutting may be added as necessary to complete the fiber-reinforced plastic composite.

For the present invention, the resin may be a thermoplastic resin, but it is preferably a thermosetting resin. Useful examples of the thermosetting resin include unsaturated polyester, vinyl ester, epoxy, phenol (resol type), urea-melamine, and polyimide, as well as copolymers thereof, modifications thereof, and blends of two or more thereof. A curing agent or a curing accelerator may be included. It is more preferable to use a resin that cures within 5 minutes at an appropriate temperature and allows the fiber-reinforced plastic part to be demolded. For the resin, a higher curing speed is more preferable because it realizes a faster molding cycle. More preferably, the time required for the resin to cure is 2 minutes or less. Here, the state of the cured resin is not particularly specified as long as it can be demolded, and for example, the resin may be in a state in which the degree of curing is 70% or more.

For exemplary embodiments of the present invention, the thickness of the metal part is 0.5 mm to 3 mm. The thickness of the metal part referred to herein is the thickness of the metal part before it is inserted between the rib molding member and the skin molding member in the molding step and can be measured by any appropriate tool such as micrometer and caliper. If the thickness of the metal part is too small, the resultant fiber-reinforced plastic composite may be easily scraped when a projectile impacts it. In addition, wrinkles may occur in the molding step. If it is too thick, the weight increases. The thickness of the metal part is more preferably 0.7 mm to 2.7 mm, still more preferably 0.9 mm to 2.4 mm. The range may be between either upper limit and either lower limit.

The properties of the metal part are not particularly limited, and a generally known metal material may be used. Examples include pure metallic forms of aluminum, iron, copper, titanium, molybdenum, chromium, magnesium, nickel, zinc, lead, and tin. Other examples include alloys of at least two or more metals and alloys of non-metals and metals such as carbon steel, high strength steel, chrome steel, chrome molybdenum steel, nickel chrome steel, nickel chrome molybdenum steel, ducol steel, Hadfield steel, ultra-strong steel, stainless steel, cast iron, copper alloys (e.g., brass, tin bronze, aluminum bronze, etc.), aluminum alloys, magnesium alloys, titanium alloys, nickel alloys, zinc alloys, lead alloys, and tin alloys.

In particular, titanium, stainless steel, duralumin, and titanium alloys are preferred because of high lightness, strength, and impact resistance. They may contain carbon, or part of their surface or some components thereof may be oxidized, as required for particular applications.

There are no specific limitations on whether the metal part is to be surface-treated, but the adhesion between the metal part and the fiber-reinforced plastic part is improved if minute irregularities are formed. For example, the surface may be physically treated by abrasive paper or sandblasting, or may be subjected to chemical treatment to cause still smaller irregularities.

The base laminate used for exemplary embodiments of the present invention contains a plurality of incised prepreg layers, and in the molding step, they are arranged in such a manner that the absolute value of the acute angle between the orientation direction of the unidirectionally oriented fibers contained in the incised prepreg layer that is the closest to the rib molding member (hereinafter referred to as the top incised prepreg layer) and the length direction of the recessed portion of the rib molding member, which is represented as $\theta s$, is less than 60°. An angle $\theta s$ of less than 60° will allow fibers to flow easily into the recessed portion of the rib molding member, thereby serving to form a high rib filled with fibers. More preferably, the angle is less than 45°. In the case of using a rib molding member containing a plurality of recessed portions, too, fibers can be allowed to flow easily into each recessed portion if the angle between the length direction of each recessed portion and the orientation direction of the unidirectionally oriented fibers contained in the top incised prepreg layer is set to less than 60°. In particular, this has a remarkable effect when the rib molding member has a narrow recessed portion. For this embodiment, it is preferable that the width of the recessed portion, measured in the direction perpendicular to the length direction, is 0.1 to 1.5 mm. On the other hand, when $\theta s$ is more than 60°, the ends of the fibers that cross the length direction of the recessed portion are pressed against the walls of the recess, thereby resulting in a decrease in the rib formability.

In the molding step, discontinuous fibers and resin in the incised prepreg layer flow out of the base laminate into the recessed portion of the rib molding member to form a fiber-reinforced plastic part in which a rib protrudes from the plate-like portion; however, when such discontinuous fibers and resin flow into the recessed portion of the rib molding member, fibers in the plate-like portion are pulled into the rib and accordingly, this leads to deterioration in the mechanical properties of the plate-like portion if their amount is too large. As the projected rib becomes thinner, the rib can be further projected while allowing the plate-like portion to maintain good mechanical properties. In general, it is more preferable to arrange a plurality of narrow ribs, rather than providing one wide rib, because the resulting structure will have a larger surface area, which is expected to also have a heat radiation effect.

Regarding the plurality of incised prepreg layers contained in the base laminate used for exemplary embodiments of the present invention, furthermore, the number of incised prepreg layers in which the absolute value of the acute angle between the orientation direction of the unidirectionally oriented fibers contained in each incised prepreg layer and the length direction of the recessed portion of the rib molding member, which is represented as $\theta$, is less than 45° is equal to or larger than the number of incised prepreg layers in which $\theta$ is 45° C. or more, a larger number being more preferable. According to a more preferred embodiment, wherein a plurality of incised prepreg layers are contained in the base laminate, the top incised prepreg layer, i.e., the incised prepreg layer that is the closest to the rib molding member in the molding step, has an angle $\theta s$ of less than 60°, and at the same time, of the plurality of incised prepreg layers, the number of those prepreg layers in which $\theta$ is less than 45° is equal to or larger than the number of those prepreg layers in which $\theta$ is 45° or more, a larger number being more preferable. If not only the top incised prepreg layer but also inner incised prepreg layers in the base laminate have angles close to the length direction of the recessed portion, the rib can be protruded more easily from the plate-like portion, thereby allowing the rib to have improved mechanical properties. On the other hand, in order to maintain good mechanical properties in nearly perpendicular directions to the rib, it is preferable that at least one incised prepreg layer in the base laminate has a θ of 45° or more. According to another preferred embodiment wherein at least one incised prepreg layer in the base laminate has a θ of 60° or more, it is preferable that the number of incised prepreg layers in which θ is less than 30° is equal to or larger than the number of incised prepreg layers in which θ is 60° or more, a larger number being more preferable. For this embodiment, it is preferable, as in the above case, that the width of the recessed portion, measured in the direction perpendicular to the length direction, is 0.1 to 1.5 mm.

For the present invention, the product of the elastic modulus (GPa) multiplied by the thickness (mm) of the metal plate to be integrated with the fiber-reinforced plastic part is preferably 50 to 300. If this product is less than 50, a sink mark due to rib protrusion may be caused when the base laminate is pressed to protrude the rib. It is presumed that such a sink mark on the metal part surface is caused as a result of a compressive load being applied to the metal part, which is disposed on the opposite side of the rib that is formed as fibers around the rib flow into the rib, and accordingly the appearance of the metal part surface will improve as the metal part increases in thickness or increases in elastic modulus, which serves to prevent a sink mark from being caused on the metal part surface by rib protrusion. A product of more than 300 can result when the weight is too large or when a sufficiently high rigidity is developed by the metal part alone, and it will be difficult for the rib of the fiber-reinforced plastic part to have a significant reinforcing effect. It is more preferable for the product of the elastic modulus (GPa) multiplied by the thickness (mm) of the metal plate is 60 to 250. The range may be between either upper limit and either lower limit. Here, the thickness refers to the thickness of one metal plate, and when a plurality of metal plates are included, it is preferable that each of the metal plates satisfies the above requirements.

For the present invention, it is preferable that the width of the recessed portion of the rib molding member measured in the direction perpendicular to the length direction (hereinafter simply referred to as the width of the recessed portion) is smaller towards the inner end of the recessed portion of the mold. If the width of the recessed portion is smaller towards the inner, it will be easier to detach the cured fiber-reinforced plastic composite from the rib molding member.

EXAMPLES

The present invention will now be illustrated in more detail with reference to examples, but it should be understood that the invention is not construed as being limited to the aspects of the invention described in these examples.

<Production of Prepreg>

The following raw materials were used to prepare epoxy resin compositions and prepreg layers.

First, an epoxy resin (40 parts by mass of Epikote (registered trademark) 828, manufactured by Japan Epoxy Resin Co., Ltd., 25 parts by mass of Epikote (registered trademark) 1007FS, manufactured by Japan Epoxy Resin Co., Ltd., and 35 parts by mass of EPICLON (registered trademark) N740 manufactured by DIC Corporation), and a thermoplastic resin of polyvinyl formal (3 parts by mass of Vinylec (registered trademark) K, manufactured by Chisso Corporation) were put in a beaker, heated to 80° C., and kneaded for 30 minutes.

After the resin temperature was lowered to 30° C., 3.5 parts by mass of a dicyandiamide curing agent (DICY7, manufactured by Japan Epoxy Resin Co., Ltd.) and 2 parts by mass of a 2,4-toluene bis(dimethylurea) curing accelerator (Omicure (registered trademark) 24, manufactured by PTI Japan Ltd.) were added, and the mixture was stirred for 10 minutes, thereby obtaining an epoxy resin composition out of the kneader.

The epoxy resin composition obtained was applied over a sheet of silicone-coated release paper having a thickness of 100 μm using a reverse roll coater to produce a resin film of 29 g/m².

Then, a sheet of unidirectionally oriented carbon fibers (Torayca (registered trademark) T700S-12K-50C, manufactured by Toray Industries, Inc.) was sandwiched between resin films and a pressure was applied under heat to achieve impregnation with the resin composition, thereby providing a prepreg containing unidirectionally oriented carbon fibers and having a carbon fiber metsuke of 100 g/m² and a carbon fiber weight fraction of 63%.

<Production of Incised Prepreg>

A rotary blade having a plurality of blades arranged at predetermined positions were pressed against the prepreg obtained above to make incisions penetrating the prepreg. The rotary blades consist of those having an angle of +14° and those having an angle of −14° between their rotational direction and advancing direction that were arranged alternately in such a manner that all fibers in the prepreg were to be cut to 15 mm length.

<Layer Stacking Step>

The prepreg thus obtained was cut to predetermined angle and size to provide layers, which were then stacked. Every time one sheet was added, vacuum drawing was performed for 30 seconds so that no air would remain in the base laminate. For the following examples, fibers in a incised prepreg layer of 0° are oriented in the vertical direction when the incised prepreg layer, which has a length-by-width size of 100 mm×100 mm, is viewed from the front; fibers in a incised prepreg layer of 900 are oriented in the horizontal direction when the incised prepreg layer, which has a length-by-width size of 100 mm×100 mm, is viewed from the front; fibers in a incised prepreg layer of 450 are oriented in the right diagonal direction when the incised prepreg layer, which has a length-by-width size of 100 mm×100 mm, is viewed from the front; and fibers in a incised prepreg layer of −45° are oriented in the left diagonal direction when the incised prepreg layer, which has a length-by-width size of 100 mm×100 mm, is viewed from the front.

<Preparation of Metal Part>

A commercially available metal plate was cut to 100 mm×100 mm and one surface was polished with #1500 sand paper to provide a metal plate to be placed in the skin molding member. Similarly, a commercially available metal plate was cut to 20 mm×100 mm and one surface was polished with #1500 sand paper to provide a metal plate to be placed in the rib molding member. They were placed in such a manner that the unpolished surfaces were in contact with the molding members and a pressure was applied so that they were molded to the shapes of the skin and rib molding members.

<Base Material Heating Step>

The rib molding member, heated in advance to 150° C., was used as the top force whereas the skin molding member was used as the bottom force, and the base laminate and the metal part were placed between the two molding members and heated for 20 seconds. In Example 1, skin molding member-side metal plate was placed first in the skin molding member, followed by putting a base laminate on it, putting a rib molding member-side metal plate on it, and putting a rib molding member on it. At this time, the position of the metal part was adjusted so that the recessed portion of the rib molding member was not covered by the metal part. In Example 2, a skin molding member-side metal plate was placed first in the skin molding member, followed by putting a base laminate on it and putting a rib molding member on it. At this time, although the pressure is applied to the base laminate by the weight of the rib molding member, the pressure was not large enough to cause a flow of the discontinuous fibers and resin in the incised prepreg layers contained in the base material. The rib and skin molding members were located within a pressing machine and the upper press plate surface was brought closer to the rib molding member during a 20 second heating time.

<Molding Step>

After the above 20 second heating time, the press plate surface was lowered to apply a pressure of 6 MPa to the base laminate. The pressure continued to be applied for 15 minutes. Subsequently the press plate surface was raised and the mold was taken out, followed by demolding to provide a fiber-reinforced plastic composite. In the molding step, the base laminate was placed in such a manner that the length direction of the rib coincided with the 0° direction of the base laminate.

<Moldability Evaluation>

A composite composed of a fiber-reinforced plastic part and a metal part was produced using a rib molding member having two recessed potions and a skin molding member having a curved surface, as shown in FIG. 2. Except for Example 6, two types of samples were prepared, that is, those having two recessed portions both having a width of 2.0 mm and those having two recessed portions both having a width of 1.0 mm, and the degree of filling of the ribs with fibers was evaluated according to the three stage criteria described below. Each recessed portion had a depth of 5 mm.

A: The rib was completely filled with carbon fibers.
B: The rib was filled with carbon fibers to some extent, and the carbon fibers in the rib reached a height of 4 to 5 mm.
C: The rib was not completely filled with carbon fibers, and the height of the carbon fibers in the rib was lower than 4 mm.

<Evaluation for Sink Marks on Metal Part>

For sink marks that occur in the surface of the metal part, which corresponds to the back surface of the rib, evaluations were made according to the three stage criteria described below.

A: No sink marks are visible at all, and surface irregularities cannot be detected to the touch.
B: Sink marks are visible, but surface irregularities cannot be detected to the touch.
C: Sink marks are visible, and surface irregularities can be detected to the touch.

Example 1

The base laminate used had a layered structure of [+45°/0°/−45°/90° ]s. Aluminum plates having a thickness of 0.5 mm (HA0513, manufactured by Hikari Corporation) were used for the metal part. The product of the elastic modulus (70 GPa) multiplied by the thickness (0.5 mm) of these metal plates was 35. In the molding step, the base laminate was placed in the mold in such a manner that the angle formed between the fiber direction in the surface of the base laminate and the length direction of the rib was 45°. At this time, the angle θs was 45°. Metal plates were placed in both the skin molding member and the rib molding member.

Both the recessed portions with a width of 2.0 mm and those with a width of 1.0 mm were found to be filled amply. The fiber-reinforced plastic part was provided with metal parts on both the skin side and the rib side, and was so high in rigidity that it was not dented when pressed by a finger.

Example 2

Except that a metal plate was disposed only in the skin molding member in the molding step, the same procedure as in Example 1 was carried out to produce a fiber-reinforced plastic composite.

Both the recessed portions with a width of 2.0 mm and those with a width of 1.0 mm were found to be filled amply. The fiber-reinforced plastic part was not dented when pressed by a finger, and the fiber-reinforced plastic part obtained was lighter than that obtained in Example 1.

Example 3

The base laminate used had a layered structure of [0°/90°/0°/0°/90°/0°]. In the molding step, furthermore, the base laminate was placed in the mold in such a manner that the fiber direction in the surface of the base laminate and the length direction of the rib coincided with each other. At this time, the incised prepreg layers having an angle θ, which is defined above, of less than 45° accounted for a larger proportion than the incised prepreg layers having an angle θ of 45° or more. In addition, as in Example 2, another fiber-reinforced plastic composite was produced by using a rib molding member having recessed portions having a width of 1.0 mm. The degree of filling of the rib was higher than in Example 2.

Example 4

Except that an aluminum plate with a thickness of 1.0 mm (HA1013, manufactured by Hikari Corporation) was used for the metal part, the same procedure as in Example 3 was carried out to produce a fiber-reinforced plastic composite using a rib molding member having recessed portions with a width of 1 mm. The product of the elastic modulus (70 GPa) multiplied by the thickness (1.0 mm) of the metal plate was 70. Although sink marks were found on the metal parts in Examples 1 to 3, no sink marks were found in this example.

Example 5

Except that a stainless steel (SUS430) plate with a thickness of 0.5 mm (HS0531, manufactured by Hikari Corporation) was used for the metal part, the same procedure as in Example 3 was carried out to produce a fiber-reinforced plastic composite using a rib molding member having recessed portions with a width of 1.0 mm. The product of the elastic modulus (200 GPa) multiplied by the thickness (0.5 mm) of these metal plates was 100. Although the thickness of the metal part was smaller than that in Example 4, no sink marks were found here either.

Example 6

Except for using a rib molding member in which the width of each recessed portion, measured in the direction perpendicular to its length direction, was narrower towards the inner end of the recessed portion, the same procedure as in Example 4 was carried out to produce a fiber-reinforced plastic composite. The width was 1.0 mm at the root of the recessed portion and 0.6 mm at the tip, i.e., at the inner end.

The resulting fiber-reinforced plastic composite was similar to the one obtained in Example 4, but it was demolded smoothly.

Comparative Example 1

Except that the lamination structure of the base laminate was set to the [90°/0° ]3 s, that the base laminate was placed in the mold in such a manner that the angle formed between the fiber direction in the surface of the base laminate and the length direction of the rib was 90° in the mold, and that the angle θs defined above was set to more than 60°, the same procedure as in Example 2 was carried out to produce a fiber-reinforced plastic composite.

The rib with a width of 2.0 mm was filled to some extent. The degree of filling of the rib with a width of 1.0 mm was obviously insufficient.

Comparative Example 2

Except that no incisions were made in the prepreg, the same procedure as in Example 2 was carried out to produce a fiber-reinforced plastic composite. Results showed that the degree of filling with fibers was obviously lower than sufficient in both the rib with a width of 2.0 mm and the rib with a width of 1.0 mm.

Comparative Example 3

A prepreg was cut to prepare chopped strands with a width of 1.0 mm and a length of 25 mm and processed into a sheet, which was pressed using a plate while heating at 70° C. to provide a SMC layer with a thickness of 1 mm in which fibers were oriented randomly. Except for using this SMC, the same procedure as in Example 2 was carried out to produce a fiber-reinforced plastic composite. Results showed that the degree of filling with fibers was obviously lower than sufficient in both the rib with a width of 2.0 mm and the rib with a width of 1.0 mm.

[Table 1]

EXPLANATION OF NUMERALS

1: Metal part
2: Plate-like portion
3: Rib
4: Rib molding member
5: Skin molding member
6: Recessed portion

The invention claimed is:

1. A method for manufacturing a fiber-reinforced plastic composite containing a fiber-reinforced plastic part having a plate-like portion and a rib protruding from one surface of the plate-like portion, and a metal part laminated on part of or all of the plate-like portion of the fiber-reinforced plastic part, comprising:
  a lamination step for stacking a plurality of sheets of base material to form a base laminate,
  a base material heating step for heating the base laminate, and
  a molding step for integrating the base laminate and the metal part by pressing them between a rib molding member having a recessed portion for forming a rib and a skin molding member free of such a recessed portion in a pressing device,
  the recessed portion having a width, measured in a direction perpendicular to a length direction of the recessed portion of the rib molding member, of 0.1 to 1.5 mm,
  the metal part having an average thickness of 0.5 to 3 mm,
  the base laminate including, as sheets of base material, a plurality of incised prepreg layers, each prepreg layer containing unidirectionally oriented fibers and a resin, and a plurality of incisions crossing the fibers to provide discontinuous fibers in the incised prepreg layers,
  wherein in the molding step, the discontinuous fibers in the incised prepreg layers contained in the base laminate flow together with the resin, thereby shaping the plate-like portion while forming the rib at the same time, and
  in the molding step, an absolute value of an acute angle between an orientation direction of the unidirectionally oriented fibers included in the incised prepreg layer that is closest to the rib molding member and the length

TABLE 1

| | Metal plate | | elastic modulus × thickness | Moldability evaluation | | Sink mark evaluation | |
|---|---|---|---|---|---|---|---|
| | type | thickness [mm] | | width 2.0 mm | width 1.0 mm | width 2.0 mm | width 1.0 mm |
| Example 1 | aluminum | 0.5 | 35 | B | B | C | B |
| Example 2 | aluminum | 0.5 | 35 | A | B | C | B |
| Example 3 | aluminum | 0.5 | 35 | — | A | — | B |
| Example 4 | aluminum | 1.0 | 70 | — | A | — | A |
| Example 5 | stainless steel | 0.5 | 100 | — | A | — | A |
| Example 6 | aluminum | 1.0 | 70 | — | A | — | A |
| Comparative example 1 | aluminum | 0.5 | 35 | B | C | C | B |
| Comparative example 2 | aluminum | 0.5 | 35 | C | C | — | — |
| Comparative example 3 | aluminum | 0.5 | 35 | C | C | — | — | direction of the recessed portion of the rib molding member, which is represented as θs, being less than 60°, wherein the metal part has a product of its elastic modulus (GPa) multiplied by its thickness (mm) in the range of 50 to 300.

2. The method for manufacturing a fiber-reinforced plastic part as set forth in claim 1, wherein a plurality of incised prepreg layers are contained in the base laminate, and a number of incised prepreg layers in which the absolute value of the acute angle between the orientation direction of the unidirectionally oriented fibers contained in each incised prepreg layer and the length direction of the recessed portion of the rib molding member, which is represented as θ, is less than 45° is equal to or larger than a number of incised prepreg layers in which θ is 45° or more.

3. The method for manufacturing a fiber-reinforced plastic composite as set forth in claim 1, wherein the width of each recessed portion of the rib molding member, measured in the direction perpendicular to its length direction, is narrower towards the inner end of the recessed portion.

4. The method for manufacturing a fiber-reinforced plastic composite as set forth in claim 1, wherein a plurality of incised prepreg layers are contained in the base laminate, a top incised prepreg layer, that is the closest to the rib molding member in the molding step, has an angle θs of less than 60°, and at the same time, of the plurality of incised prepreg layers, a number of those prepreg layers in which θ is less than 45° is equal to or larger than a number of those prepreg layers in which θ is 45° or more.

5. The method for manufacturing a fiber-reinforced plastic composite as set forth in claim 1, wherein the metal part has a product of its elastic modulus (GPa) multiplied by its thickness (mm) in a range of 60 to 250.

6. The method for manufacturing a fiber-reinforced plastic composite as set forth in claim 1, wherein the resin is a thermosetting resin.

7. A method for manufacturing a fiber-reinforced plastic composite containing a fiber-reinforced plastic part having a plate-like portion and a rib protruding from one surface of the plate-like portion, and a metal part laminated on part of or all of the rib-protrusion-free side surface of the plate-like portion of the fiber-reinforced plastic part, comprising a lamination step for stacking a plurality of sheets of base material to form a base laminate, a base material heating step for heating the base laminate, and a molding step for integrating the base laminate and the metal part by pressing them between a rib molding member having a recessed portion for forming a rib and a skin molding member free of such a recessed portion in a pressing device, the recessed portion having a width, measured in a direction perpendicular to a length direction of the recessed portion of the rib molding member, of 0.1 to 1.5 mm, the metal part having an average thickness of 0.5 to 3 mm, the base laminate including, as sheets of base material, a plurality of incised prepreg layers, each prepreg layer containing unidirectionally oriented fibers and a resin, and a plurality of incisions crossing the fibers to provide discontinuous fibers in the incised prepreg layers, wherein in the molding step, the discontinuous fibers in the incised prepreg layers contained in the base laminate flow together with the resin, thereby shaping the plate-like portion while forming the rib at the same time, and in the molding step, an absolute value of an acute angle between an orientation direction of the unidirectionally oriented fibers included in the incised prepreg layer that is closest to the rib molding member and the length direction of the recessed portion of the rib molding member, which is represented as θs, being less than 60°, wherein the metal part has a product of its elastic modulus (GPa) multiplied by its thickness (mm) in the range of 50 to 300.

* * * * *